US011285946B2

United States Patent
Hamada et al.

(10) Patent No.: US 11,285,946 B2
(45) Date of Patent: Mar. 29, 2022

(54) MOVING OBJECT DETECTOR, VEHICLE CONTROL SYSTEM, METHOD FOR DETECTING MOVING OBJECT, AND METHOD FOR CONTROLLING VEHICLE

(71) Applicant: Mitsubishi Electric Corporation, Tokyo (JP)

(72) Inventors: Tetsuharu Hamada, Tokyo (JP); Yasuyoshi Hori, Tokyo (JP); Masaya Endo, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 463 days.

(21) Appl. No.: 16/363,078

(22) Filed: Mar. 25, 2019

(65) Prior Publication Data
US 2019/0344788 A1 Nov. 14, 2019

(30) Foreign Application Priority Data

May 9, 2018 (JP) .............................. JP2018-090376

(51) Int. Cl.
*B60W 30/08* (2012.01)
*B60W 30/16* (2020.01)
*G01S 5/02* (2010.01)

(52) U.S. Cl.
CPC ........... *B60W 30/16* (2013.01); *G01S 5/0284* (2013.01); *B60W 2520/10* (2013.01); *B60W 2520/14* (2013.01)

(58) Field of Classification Search
None
See application file for complete search history.

(56) References Cited

U.S. PATENT DOCUMENTS

| 2009/0292468 A1* | 11/2009 | Wu | G01S 13/867 |
| | | | 701/301 |
| 2010/0076684 A1* | 3/2010 | Schiffmann | G01S 13/726 |
| | | | 701/301 |

(Continued)

FOREIGN PATENT DOCUMENTS

| JP | 06-297982 A | 10/1994 |
| JP | 2011-098586 A | 5/2011 |

(Continued)

OTHER PUBLICATIONS

The Reasons of Refusal dated Aug. 20, 2019, from the Japanese Patent Office in application No. 2018-090376.
Japanese Office Action for 2018-090376 dated Mar. 12, 2019.

*Primary Examiner* — Jonathan M Dager
(74) *Attorney, Agent, or Firm* — Sughrue Mion, PLLC; Richard C. Turner (57) ABSTRACT

Provided is a moving object detector capable of acquiring a position history of a moving object that is less affected by the behavior of a subject vehicle. In a moving object detector, a moving-object relative position acquiring unit acquires position coordinates of a moving object expressed in a subject-vehicle-based coordinate system that is based on the position of a subject vehicle. A subject-vehicle state quantity acquiring unit acquires the state quantity of the subject vehicle. A coordinate converter generates a history of position coordinates of the moving object expressed in a moving-object-based coordinate system that is based on the position of the moving object, on the basis of the position coordinates of the moving object expressed in the subject-vehicle-based coordinate system, and the state quantity of the subject vehicle.

14 Claims, 6 Drawing Sheets

(56) References Cited

U.S. PATENT DOCUMENTS

| | | | | |
|---|---|---|---|---|
| 2010/0214155 A1* | 8/2010 | Harada | ............... | B60R 21/0134 342/147 |
| 2010/0315505 A1* | 12/2010 | Michalke | ................ | G06T 7/251 348/118 |
| 2011/0106391 A1* | 5/2011 | Shida | ........................ | G08G 1/22 701/96 |
| 2012/0130595 A1* | 5/2012 | Hayakawa | ............ | B60W 30/12 701/42 |
| 2013/0060443 A1* | 3/2013 | Shida | ................. | B60K 31/0008 701/96 |
| 2013/0131925 A1* | 5/2013 | Isaji | ...................... | B60W 30/16 701/41 |
| 2015/0120137 A1* | 4/2015 | Zeng | .................. | B62D 15/0265 701/41 |
| 2015/0120138 A1* | 4/2015 | Zeng | ..................... | G01S 7/4808 701/41 |
| 2015/0175001 A1* | 6/2015 | Okuda | ................... | B60W 50/14 701/34.4 |
| 2015/0294571 A1* | 10/2015 | Shida | ..................... | G08G 1/161 701/409 |
| 2016/0351052 A1* | 12/2016 | Yoshitomi | ........... | G08G 1/09626 |
| 2017/0088167 A1* | 3/2017 | Fujii | ........................ | B62D 6/002 |
| 2017/0101092 A1* | 4/2017 | Nguyen Van | ......... | G01S 13/723 |
| 2017/0158197 A1* | 6/2017 | Johnson | ................ | B60W 10/20 |
| 2017/0261599 A1* | 9/2017 | Zeng | ..................... | G01S 7/4004 |
| 2017/0345312 A1* | 11/2017 | Shimizu | .................. | B60R 21/00 |
| 2018/0009438 A1* | 1/2018 | Masui | ............. | B60W 30/18145 |
| 2018/0114442 A1* | 4/2018 | Minemura | .......... | B60T 8/17558 |
| 2018/0118202 A1* | 5/2018 | Shimizu | ................ | B60W 30/09 |
| 2018/0154825 A1* | 6/2018 | Tanaka | ............... | G06K 9/00798 |
| 2018/0178786 A1* | 6/2018 | Takaki | ................... | B60W 30/09 |
| 2018/0204460 A1* | 7/2018 | Deng | ..................... | G08G 1/163 |
| 2018/0211536 A1* | 7/2018 | Akamine | ................ | G01S 13/723 |
| 2018/0215386 A1* | 8/2018 | Naserian | .......... | G08G 1/096783 |
| 2018/0238696 A1* | 8/2018 | Takeda | ................ | G01C 21/3602 |
| 2018/0326982 A1* | 11/2018 | Paris | ...................... | G08G 1/166 |
| 2018/0339728 A1* | 11/2018 | Hamada | ................. | B62D 6/002 |
| 2019/0012920 A1* | 1/2019 | Tamura | ................. | B60W 30/08 |
| 2019/0092330 A1* | 3/2019 | Ide | ........................ | G01S 13/726 |
| 2019/0103023 A1* | 4/2019 | McNew | ................. | G08G 1/0962 |
| 2019/0118807 A1* | 4/2019 | Takaki | ................... | B60W 30/09 |
| 2019/0241198 A1* | 8/2019 | Mori | ..................... | B60W 50/14 |
| 2019/0248369 A1* | 8/2019 | Mizuno | ................. | B60W 10/04 |
| 2019/0315351 A1* | 10/2019 | Smith | ..................... | G01S 17/58 |
| 2020/0039515 A1* | 2/2020 | Sasaki | ................. | B60W 30/162 |
| 2020/0057090 A1* | 2/2020 | Stachnik | ................ | G01S 13/42 |
| 2020/0074860 A1* | 3/2020 | Kitaura | ................... | B60R 21/00 |
| 2020/0086791 A1* | 3/2020 | Hardy | ..................... | G06T 5/005 |
| 2020/0088539 A1* | 3/2020 | Shashua | ................ | B60W 60/001 |
| 2020/0249345 A1* | 8/2020 | Alenljung | ............... | B60T 15/02 |
| 2020/0249682 A1* | 8/2020 | Kojo | .................... | G05D 1/0214 |
| 2021/0061275 A1* | 3/2021 | Takahama | ............. | B60W 10/20 |

FOREIGN PATENT DOCUMENTS

| | | |
|---|---|---|
| JP | 2015077908 A | 4/2015 |
| JP | 2017-052411 A | 3/2017 |

\* cited by examiner

MOVING OBJECT DETECTOR, VEHICLE CONTROL SYSTEM, METHOD FOR DETECTING MOVING OBJECT, AND METHOD FOR CONTROLLING VEHICLE

BACKGROUND OF THE INVENTION

Field of the Invention

The present invention relates to a technique of detecting the position of a moving object around a vehicle.

Description of the Background Art

Follow-up travel systems are known that control a vehicle to travel while following a preceding vehicle (i.e., another vehicle traveling ahead). Such a system is described in Japanese Patent Application Laid-Open No. 6-297982. The follow-up travel system includes a moving object detector that detects the position of the preceding vehicle using a radar sensor, a camera, and other means. This system controls the vehicle to travel based on a travel trajectory of the preceding vehicle that is obtained from a position history of the preceding vehicle.

A conventional moving object detector acquires the position of a preceding vehicle as a position relative to the position of a subject vehicle. The acquired position of the preceding vehicle is hence affected by the behavior of the subject vehicle. For instance, when the subject vehicle snakes, whereas the preceding vehicle travels straight ahead, a snaking travel trajectory is acquired from an acquired position history of the preceding vehicle. Unfortunately, this causes difficulty in determining an accurate travel trajectory of the preceding vehicle.

SUMMARY

It is an object of the present invention to provide a moving object detector capable of acquiring a position history of a moving object that is less affected by the behavior of a subject vehicle.

A moving object detector according to an aspect of the present invention includes a moving-object relative position acquiring unit, a subject-vehicle state quantity acquiring unit, and a coordinate converter. The moving-object relative position acquiring unit acquires position coordinates of a moving object expressed in a subject-vehicle-based coordinate system that is based on the position of a subject vehicle. The subject-vehicle state quantity acquiring unit acquires the state quantity of the subject vehicle. The coordinate converter generates a history of position coordinates of the moving object expressed in a moving-object-based coordinate system that is based on the position of the moving object, on the basis of the position coordinates of the moving object expressed in the subject-vehicle-based coordinate system, and the state quantity of the subject vehicle.

According to the aspect of the present invention, the history of the position coordinates of the moving object is expressed in the moving-object-based coordinate system, which is based on the position of the moving object. This obtains position coordinates of the moving object that are less affected by the behavior of the subject vehicle.

These and other objects, features, aspects and advantages of the present invention will become more apparent from the following detailed description of the present invention when taken in conjunction with the accompanying drawings.

DESCRIPTION OF THE PREFERRED EMBODIMENT

Figure 1:
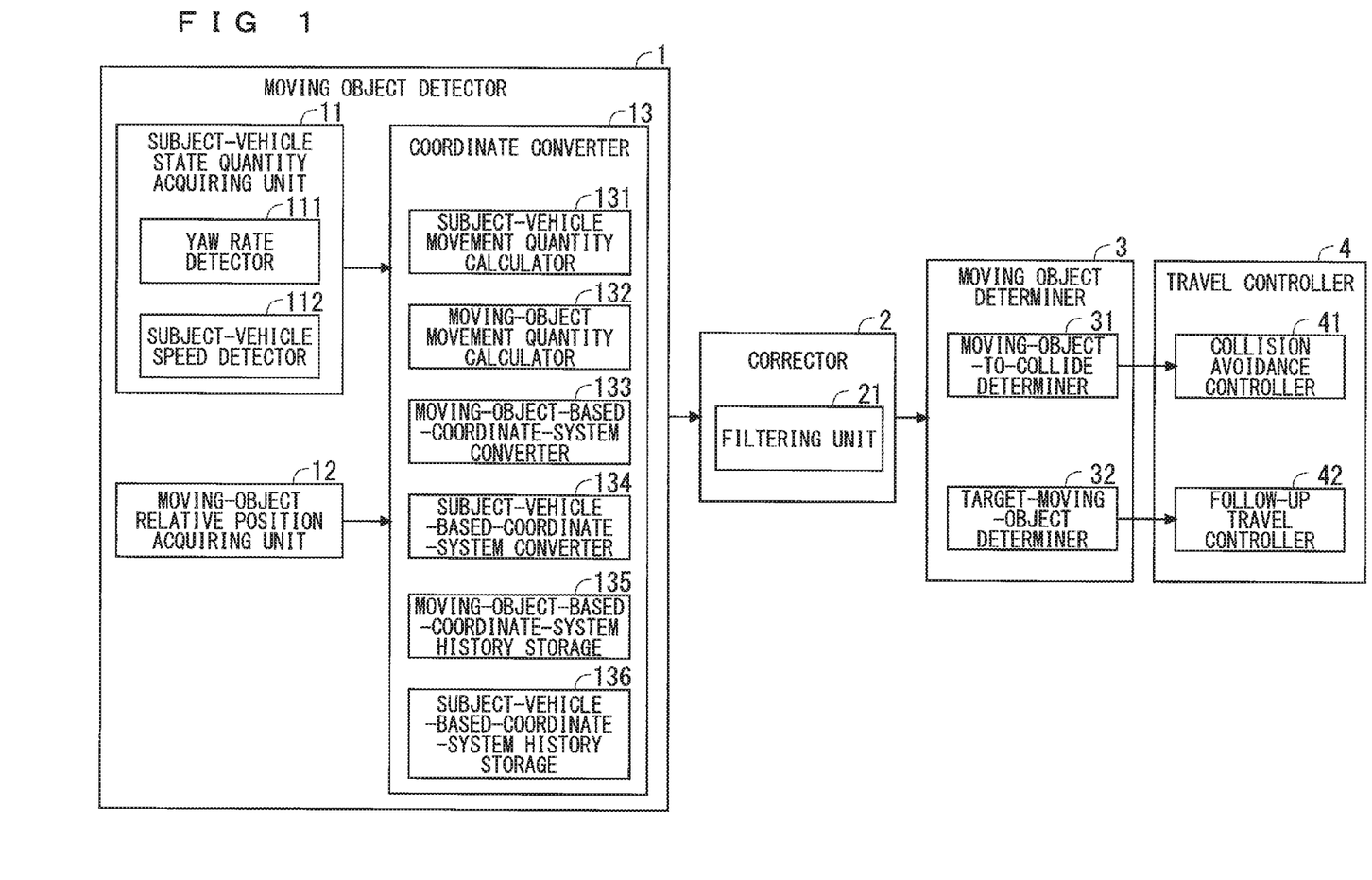
FIG. 1 is a block diagram of the configuration of a vehicle control system according to a preferred embodiment.

FIG. 1 is a block diagram of the configuration of a vehicle control system according to a preferred embodiment of the present invention. A "subject vehicle" in the following description means a vehicle equipped with this vehicle control system. Further, a "moving object" in the following description means a moving object excluding the subject vehicle, and may include not only a vehicle, but also a bicycle, a pedestrian, and other things. A "target moving object", which is a preceding vehicle followed by the subject vehicle, means a vehicle excluding the subject vehicle.

As illustrated in FIG. 1, the vehicle control system according to the preferred embodiment includes a moving object detector 1, a corrector 2, a moving object determiner 3, and a travel controller 4.

The moving object detector 1 detects the position of a moving object around a subject vehicle, and stores a history of the detected position of the moving object. The moving object detector 1 includes a subject-vehicle state quantity acquiring unit 11, a moving-object relative position acquiring unit 12, and a coordinate converter 13.

The subject-vehicle state quantity acquiring unit 11 acquires various kinds of subject-vehicle state quantity indicating the travel state of the subject vehicle, and transmits the acquired subject-vehicle state quantity to the coordinate converter 13. The subject-vehicle state quantity acquiring unit 11 in the preferred embodiment includes a yaw rate detector 111 and a subject-vehicle speed detector 112.

The yaw rate detector 111 detects the yaw rate of the subject vehicle, which is the rate of variation in rotation angle in a turning direction, and outputs a signal in accordance with the detected yaw rate to the coordinate converter 13. The subject-vehicle speed detector 112 detects the travel speed of the subject vehicle, and outputs a signal in accordance with the detected travel speed to the coordinate converter 13. The subject-vehicle state quantity received by the coordinate converter 13 needs to include at least information about the travel speed and yaw rate of the subject vehicle. The subject-vehicle state quantity may include information besides these information pieces. Further, the coordinate converter 13 converts the yaw rate into the quantity of variation in yaw angle, which will be described later on. Thus, the subject-vehicle state quantity may include not the yaw rate, but the yaw angle.

The moving-object relative position acquiring unit 12 detects the position of the moving object relative to the position of the subject vehicle, and outputs a signal in accordance with the relative position to the coordinate converter 13. That is, the moving-object relative position acquiring unit 12 acquires position coordinates of the moving object expressed in a fixed coordinate system (subject-vehicle fixed coordinate system) that is based on the current position of the subject vehicle. Hereinafter, the subject-vehicle fixed coordinate system is referred to as a "subject-vehicle-based coordinate system".

In the subject-vehicle-based coordinate system in the preferred embodiment, the direction of travel of the subject vehicle is defined as an X-direction (the forward direction is defined as a positive direction; and the backward direction, a negative direction), and a horizontal direction perpendicular to the X-direction is defined as a Y-direction (the rightward direction is defined as a positive direction; and the leftward direction, a negative direction). As such, a set of position coordinates of the subject vehicle is always the origin point (0, 0) of the subject-vehicle-based coordinate system. With regard to the turning direction of the subject vehicle, such as the yaw rate, a clockwise direction is defined as a positive direction; and a counterclockwise direction, a negative direction. In the following description, the X-direction is also referred to as a "longitudinal direction"; the Y-direction, a "lateral direction"; an X-coordinate; a "longitudinal position"; and a Y-coordinate, a "lateral position".

The moving-object relative position acquiring unit 12 in the preferred embodiment analyzes an image ahead of the subject vehicle that is captured by, for instance, a camera disposed at the back side of the rear-view mirror of the subject vehicle, and then detects the relative position of the moving object. How to detect the relative position of the moving object is not limited to this way. For instance, the moving-object relative position acquiring unit 12 may detect the relative position of the moving object using a millimeter wave radar, a laser radar, or other types of radar.

The preferred embodiment uses another fixed coordinate system that is based on the current position of the moving object as a coordinate system expressing the position of the moving object detected by the moving-object relative position acquiring unit 12. Hereinafter, this coordinate system is referred to as a "moving-object-based coordinate system".

In the moving-object-based coordinate system, the direction of travel of the moving object is defined as an x-direction (the forward direction is defined as a positive direction; and the backward direction, a negative direction), and a horizontal direction perpendicular to the x-direction is defined as a y-direction (the rightward direction is defined as a positive direction; and the leftward direction, a negative direction). As such, a set of position coordinates of the moving object is always the origin point (0, 0) of the moving-object-based coordinate system. With regard to the turning direction of the moving object, such as the yaw rate, a clockwise direction is defined as a positive direction; and a counterclockwise direction, a negative direction. In the following description, the x-direction is also referred to as a "longitudinal direction"; the y-direction, a "lateral direction"; an x-coordinate; a "longitudinal position"; and a y-coordinate, a "lateral position".

The coordinate converter 13 converts the history of the position coordinates of the moving object expressed in the subject-vehicle-based coordinate system, which is acquired by the subject-vehicle state quantity acquiring unit 11, into a history of position coordinates of the moving object expressed in the moving-object-based coordinate system. The coordinate converter 13 includes a subject-vehicle movement quantity calculator 131, a moving-object movement quantity calculator 132, a moving-object-based-coordinate-system converter 133, a subject-vehicle-based-coordinate-system converter 134, a moving-object-based-coordinate-system history storage 135, and a subject-vehicle-based-coordinate-system history storage 136.

Here, the moving-object-based-coordinate-system history storage 135 stores the history of the position coordinates of the moving object expressed in the moving-object-based coordinate system, which is generated by the coordinate converter 13. However, the history of the position coordinates of the moving object expressed in the moving-object-based coordinate system alone cannot tell a positional relationship between the moving object and the subject vehicle. Accordingly, the coordinate converter 13 re-converts the history of the position coordinates of the moving object expressed in the moving-object-based coordinate system, which is stored in the moving-object-based-coordinate-system history storage 135, into a history of position coordinates of the moving object expressed in the subject-vehicle-based coordinate system, and then stores the re-converted history in the subject-vehicle-based-coordinate-system history storage 136. This history of the position coordinates of the moving object stored in the subject-vehicle-based-coordinate-system history storage 136 is used for various kinds of processing performed by the moving object determiner 3 and the travel controller 4.

The subject-vehicle movement quantity calculator 131 calculates the movement quantity (quantity of variation in position and orientation) of the subject vehicle on the basis of the travel speed and yaw rate of the subject vehicle, which are acquired by the subject-vehicle state quantity acquiring unit 11, at every predetermined control cycle (a control cycle of 100 msec in the preferred embodiment).

The moving-object movement quantity calculator 132 calculates the movement quantity (quantity of variation in position and orientation) of the moving object on the basis of the relative position of the moving object, which is acquired by the moving-object relative position acquiring unit 12, at every control cycle. It is noted that when the moving object detector 1 can acquire information about the relative speed and yaw rate of the moving object, the moving-object movement quantity calculator 132 may calculate the movement quantity of the moving object on the basis of these values.

The subject-vehicle-based-coordinate-system converter 134 converts a history of position coordinates of the moving object expressed in the subject-vehicle-based coordinate system that is based on the position of the subject vehicle in a previous control cycle, into a history of position coordinates in the subject-vehicle-based coordinate system that is based on the position of the subject vehicle in a current control cycle, at every control cycle in accordance with variations in the position of the subject vehicle. Such coordinate conversion is required, because the origin point of the subject-vehicle-based coordinate system, the X-direction, and the Y-direction change depending on the position and orientation of the subject vehicle.

To be specific, the subject-vehicle-based-coordinate-system converter 134 performs coordinate conversion using Expression (1) indicated below at every control cycle on the basis of the movement quantity in the longitudinal and lateral directions of the subject vehicle, and the quantity of variation in the yaw angle of the subject vehicle. Here, the movement quantity in the longitudinal and lateral directions is calculated from the travel speed of the subject vehicle. Moreover, the quantity of variation in the yaw angle is calculated from the yaw rate of the subject vehicle.

$$\begin{bmatrix} X' \\ Y' \end{bmatrix} = \begin{bmatrix} \cos\theta & \sin\theta \\ -\sin\theta & \cos\theta \end{bmatrix} \begin{bmatrix} X \\ Y \end{bmatrix} + \begin{bmatrix} -sx \\ -sy \end{bmatrix} \quad (1)$$

In Expression (1), sx denotes the quantity of longitudinal (X-direction) movement in the position of the subject vehicle at every control cycle, and sy denotes the quantity of lateral (Y-direction) movement in the position of the subject vehicle. Further, $[X\ Y]^T$ denotes a set of coordinates in the previous control cycle, and $[X'\ Y']^T$ denotes a set of coordinates in the current control cycle. Still further, $\theta$ denotes the integral of the yaw rate of the subject vehicle from the previous control cycle to the current control cycle, and indicates the yaw angle of the subject vehicle. Coordinate conversion at every control cycle in the subject-vehicle-based-coordinate-system converter 134 enables coordinate expression in which a set of current position coordinates of the subject-vehicle is the origin point (0,0).

Figure 2:
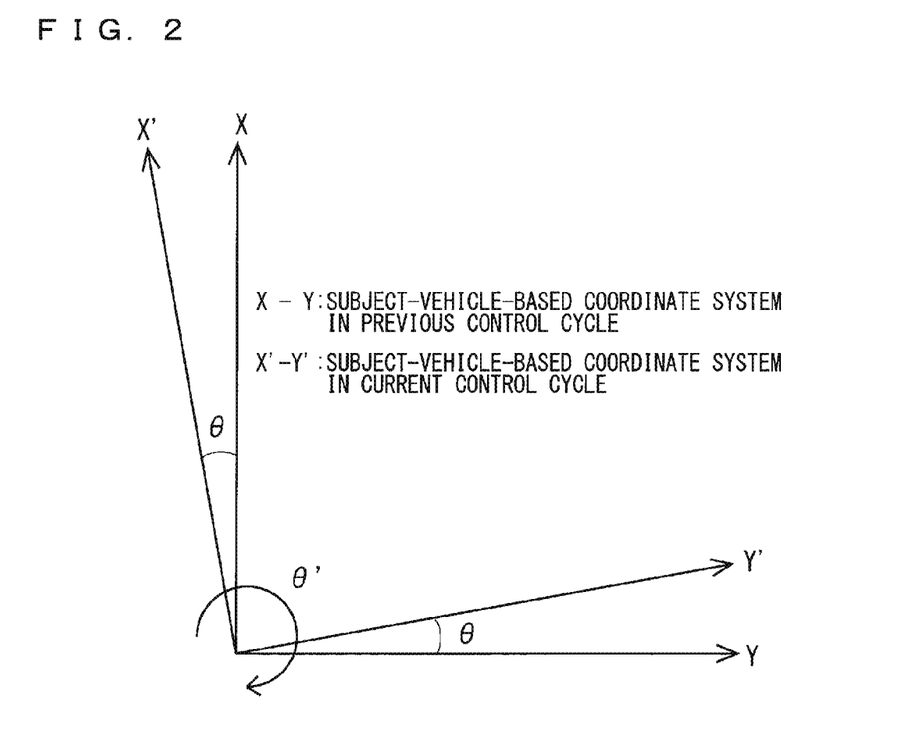
FIG. 2 is a graph showing an example of the relationship between a subject-vehicle-based coordinate system in a previous control cycle and a subject-vehicle-based coordinate system in a current control cycle.

FIG. 2 is a graph showing an example of the relationship between the subject-vehicle-based coordinate system in the previous control cycle and the subject-vehicle-based coordinate system in the current control cycle. In FIG. 2, the quantity of variation in the position of the subject vehicle (sx and sy) is ignored. When the subject vehicle is not moving, or when the movement quantity of the subject vehicle is too small to be detected by the subject-vehicle state quantity acquiring unit 11, sx and sy are both zero.

Figure 3:
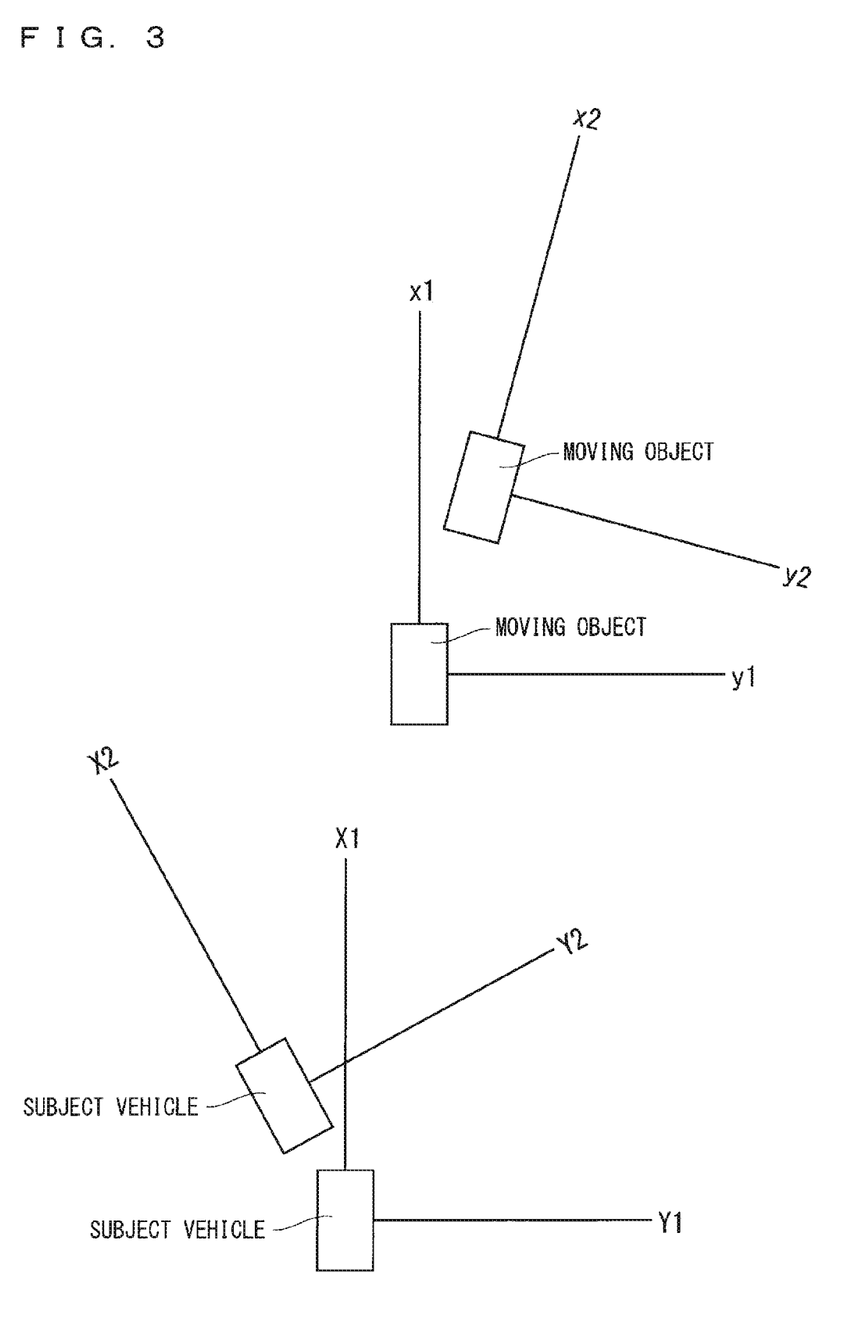
FIG. 3 is a graph showing an example of the relationship between the subject-vehicle-based coordinate system and the moving-object-based coordinate system.

FIG. 3 is a graph showing an example of the relationship between the subject-vehicle-based coordinate system and the moving-object-based coordinate system. FIG. 3 shows a subject-vehicle-based coordinate system X1Y1 in the previous control cycle, a subject-vehicle-based coordinate system X2Y2 in the current control cycle, a moving-object-based coordinate system x1y1 in the previous control cycle, and a moving-object-based coordinate system x2y2 in the current control cycle.

As earlier mentioned, the moving-object-based-coordinate-system history storage 135 stores the history of the position coordinates of the moving object expressed in the moving-object-based coordinate system. The origin point, x-direction, and y-direction of the moving-object-based coordinate system change depending on the position and orientation of the moving object. Accordingly, when the moving object moves, the coordinate history expressed in the moving-object-based coordinate system needs to be converted into a coordinate history in the moving-object-based coordinate system that corresponds to the current position and orientation of the moving object.

The moving-object-based-coordinate-system converter 133 performs such coordinate conversion. The basic idea of the coordinate conversion in the moving-object-based-coordinate-system converter 133 is similar to the coordinate conversion in the subject-vehicle-based-coordinate-system converter 134.

Figure 4:
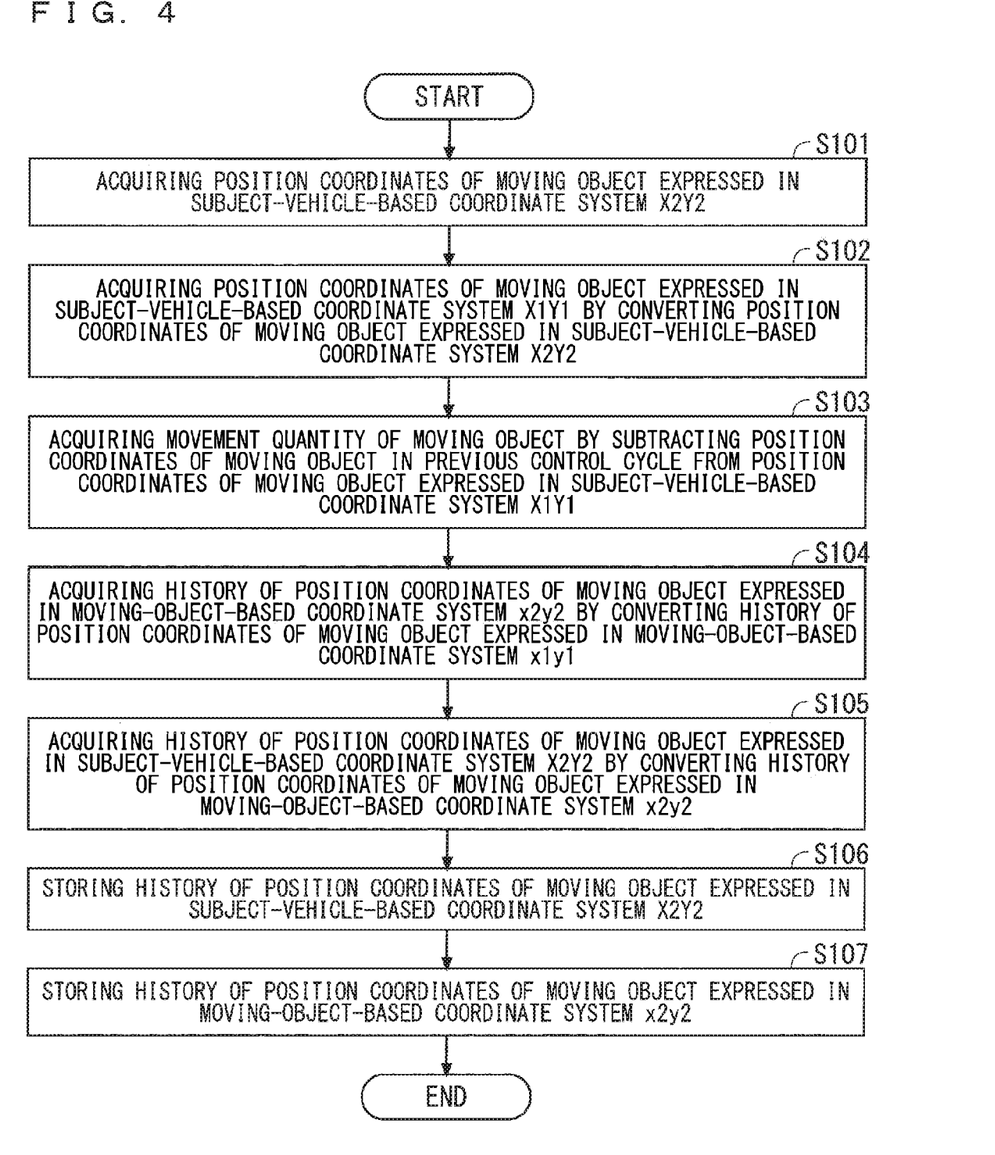
FIG. 4 is a flowchart showing coordinate conversion in a moving-object-based-coordinate-system converter.

The following describes the coordinate conversion in the moving-object-based-coordinate-system converter 133 with reference to a flowchart shown in FIG. 4. In the following description, like FIG. 3, a subject-vehicle-based coordinate system in the previous control cycle is expressed as X1Y1; a subject-vehicle-based coordinate system in the current control cycle, as X2Y2; a moving-object-based coordinate system in the previous control cycle, as x1y1; and a moving-object-based coordinate system in the current control cycle, as x2y2. In the following description, a history of position coordinates of the moving object expressed in the moving-object-based coordinate system x1y1 in the previous control cycle is stored in the moving-object-based-coordinate-system history storage 135. Moreover, a history of position coordinates of the moving object expressed in the subject-vehicle-based coordinate system X1Y1 in the previous control cycle is stored in the subject-vehicle-based-coordinate-system history storage 136.

In step S101, the moving-object-based-coordinate-system converter 133 acquires, from the moving-object relative position acquiring unit 12, position coordinates (longitudinal and lateral positions) of the moving object expressed in the subject-vehicle based coordinate system X2Y2 in the current control cycle.

In step S102, the moving-object-based-coordinate-system converter 133 acquires position coordinates of the moving object expressed in the subject-vehicle-based coordinate system X1Y1 in the previous control cycle, by converting the position coordinates of the moving object expressed in the subject-vehicle-based coordinate system X2Y2 in the current control cycle, which is acquired in step S101, through parallel-movement coordinate conversion and rotating coordinate conversion based on the movement quantity (quantity of variation in position and orientation) of the subject vehicle that is calculated between the previous control cycle and the current control cycle by the subject-vehicle movement quantity calculator 131.

In step S103, the moving-object-based-coordinate-system converter 133 acquires the movement quantity of the moving object between the previous control cycle and the current control cycle, by subtracting the position coordinates of the moving object in the previous control cycle, which is stored in the subject-vehicle-based-coordinate-system history storage 136, from the position coordinates of the moving object expressed in the subject-vehicle-based coordinate system X1Y1 in the previous control cycle, which is acquired in step S102.

In step S104, the moving-object-based-coordinate-system converter 133 acquires a history of position coordinates of the moving object expressed in the moving-object-based coordinate system x2y2 in the current control cycle, by converting the history of the position coordinates of the moving object expressed in the moving-object-based coordinate system x1y1 in the previous control cycle, which is stored in the moving-object-based-coordinate-system history storage 135, through parallel-movement coordinate conversion and rotating coordinate conversion based on the movement quantity of the moving object, which is acquired in step S103. The set of position coordinates of the moving object in the current control cycle is the origin point of the moving-object-based coordinate system x2y2.

In step S105, the moving-object-based-coordinate-system converter 133 acquires a history of position coordinates of the moving object expressed in the subject-vehicle-based coordinate system X2Y2 in the current control cycle, by converting the history of the position coordinates of the moving object expressed in the moving-object-based coordinate system x2y2 in the current control cycle, which is acquired in step S104, through parallel-movement coordinate conversion and rotating coordinate conversion based on the relative position of the moving object, which is acquired by the moving-object relative position acquiring unit 12, and on the quantity of variation in the movement quantity of the subject vehicle between the previous control cycle and the current control cycle.

In step S106, the subject-vehicle-based-coordinate-system history storage 136 stores the history of the position coordinates of the moving object expressed in the subject-vehicle-based coordinate system X2Y2 in the current control cycle, which is acquired in step S105.

In step S107, the moving-object-based-coordinate-system history storage 135 stores the history of the position coordinates of the moving object expressed in the moving-object-based coordinate system $x2y2$ in the current control cycle, which is acquired in step S104.

Referring back to FIG. 1, the corrector 2 includes a filtering unit 21. The filtering unit 21 filters the history of the position coordinates of the moving object stored in the subject-vehicle-based-coordinate-system history storage 136. Any method may be used in this filtering; for instance, common filters, such as a high-pass filter, a low-pass filter, and a band-pass filter, can be used.

Furthermore, the filtering unit 21 may filter not the history of the position coordinates of the moving object stored in the subject-vehicle-based-coordinate-system history storage 136, but the history of the position coordinates of the moving object stored in the moving-object-based-coordinate-system history storage 135. The subject-vehicle-based-coordinate-system history storage 136 stores what have been converted from the position coordinates of the moving object stored in the moving-object-based-coordinate-system history storage 135 to the subject-vehicle-based coordinate system. As a result, an effect is achieved that is similar to that achieved through filtering of the history of the position coordinates of the moving object stored in the subject-vehicle-based-coordinate-system history storage 136.

The corrector 2, although being a unit that is independent of the moving object detector 1 in FIG. 1, may be incorporated in the moving object detector 1. Further, the corrector 2 may be omitted if filtering does not need to be performed.

The moving object determiner 3 includes a moving-object-to-collide determiner 31 and a target-moving-object determiner 32. The moving-object-to-collide determiner 31 determines whether the moving object is a moving-object-to-collide that might collide against the subject vehicle, on the basis of the history of the position coordinates of the moving object after filtering, and the position coordinates of the subject vehicle. The determination on a moving-object-to-collide is made under any condition. The moving-object-to-collide determiner 31 in the preferred embodiment determines the moving object to be a moving-object-to-collide when the history of the position coordinates of the moving object approaches position coordinates of the subject vehicle (i.e., the origin point) and has a negative differential whose absolute value is greater than a predetermined threshold, that is, when the moving object is approaching the subject vehicle at equal to or greater than a certain speed.

The target-moving-object determiner 32 determines whether the moving object is a target moving object to be followed by the subject vehicle, on the basis of the history of the position coordinates of the moving object after filtering, and the position coordinates of the subject vehicle. The determination on a target moving object is also made under any condition. The target-moving-object determiner 32 in the preferred embodiment determines the moving object to be a target moving object when the history of the position coordinates of the moving object moves away from the position coordinates of the subject vehicle, and when the speed of the moving object relative to the speed of the subject vehicle is smaller than a predetermined threshold.

The travel controller 4 controls the steering angle and yaw rate of the subject vehicle. The travel controller 4 includes, for instance, an electric motor for motorized power steering wheel (any kind of electric motor, such as a DC motor or an AC motor, may be included), or a hydraulic pump for a hydraulic power steering wheel. The travel controller 4 may be any unit capable of controlling the steering of the subject vehicle; for instance, the travel controller 4 may include a system called steering-by-wire, in which a mechanical link between a steering wheel and steered wheels is eliminated.

The travel controller 4 includes a collision avoidance controller 41 and a follow-up travel controller 42. The travel controller 4 activates the collision avoidance controller 41 when the moving-object-to-collide determiner 31 determines the moving object to be a moving-object-to-collide, and activates the follow-up travel controller 42 when the target-moving-object determiner 32 determines the moving object to be a target moving object.

The collision avoidance controller 41 avoids a collision between the subject vehicle and the moving object by generating a trajectory corresponding to the history of the position coordinates of the moving object after filtering, and adding, for instance, an offset equivalent to a vehicle width to the generated trajectory, thus generating a trajectory for collision avoidance, followed by controlling the subject vehicle to travel along the trajectory for collision avoidance.

The follow-up travel controller 42 controls the subject vehicle to travel while following the moving object, by generating a trajectory for follow-up travel corresponding to the history of the position coordinates of the moving object after filtering, and controlling the subject vehicle to travel along the trajectory for follow-up travel.

In some cases, the subject vehicle, while following the moving object under the control of the follow-up travel controller 42, gets too close to the moving object because the moving object has decelerated for instance. In these cases, the collision avoidance controller 41 may be activated to avoid a collision between the subject vehicle and the moving object.

Figure 5:
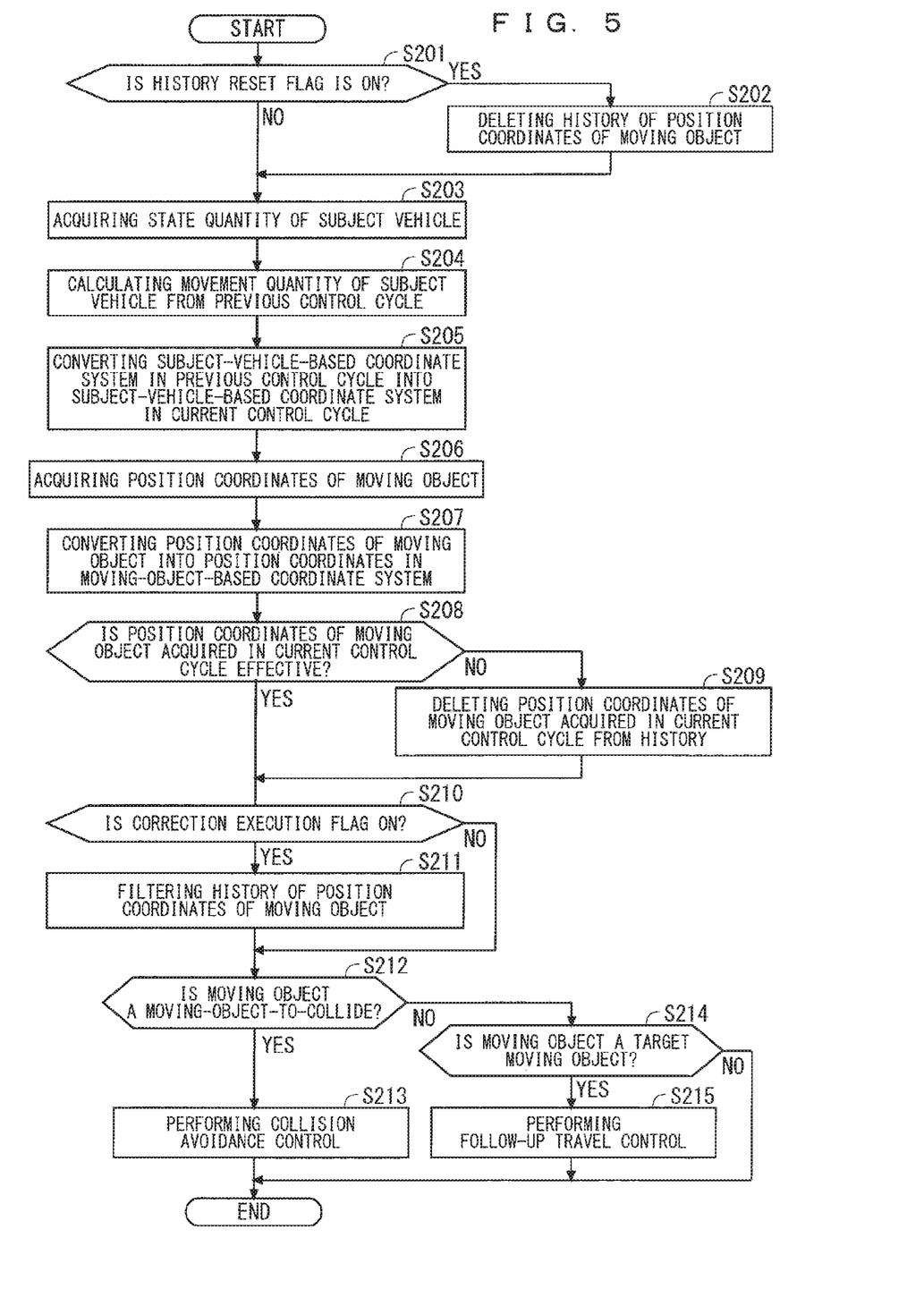
FIG. 5 is a flowchart showing the operation of the vehicle control system according to the preferred embodiment.

FIG. 5 is a flowchart showing the operation of the vehicle control system according to the preferred embodiment. The operation of the vehicle control system will be described with reference to FIG. 5. The process flow in FIG. 5 is executed at every control cycle (a control cycle of 100 msec in the preferred embodiment).

In step S201, upon entrance to a control cycle, the moving object detector 1 checks whether a history reset flag is ON. The history reset flag indicates whether to reset previously acquired position coordinate histories of the moving object. If the history reset flag is ON (i.e., if YES in step S201), the moving object detector 1 deletes, in step S202, the histories of the position coordinates of the moving object that are stored in the moving-object-based-coordinate-system history storage 135 and the subject-vehicle-based-coordinate-system history storage 136, and starts acquiring position coordinates of the moving object anew. If the history reset flag is OFF (i.e., if NO in step S201), the histories stored in the moving-object-based-coordinate-system history storage 135 and the subject-vehicle-based-coordinate-system history storage 136 are renewed without being deleted.

In step S203, the subject-vehicle state quantity acquiring unit 11 acquires the state quantity (travel speed and yaw rate) of the subject vehicle. In step S204, the subject-vehicle movement quantity calculator 131 calculates the movement quantity (quantity of variation in position and orientation) of the subject vehicle between the previous control cycle and the current control cycle.

In step S205, the coordinate converter 13 converts the subject-vehicle-based coordinate system in the previous control cycle to the subject-vehicle-based coordinate system in the current control cycle through parallel-movement coordinate conversion and rotating coordinate conversion based on the movement quantity of the subject vehicle. In step S206, the moving-object relative position acquiring unit 12 acquires the position of the moving object relative to the position of the subject vehicle, that is, the position coordinates of the moving object expressed in the subject-vehicle-based coordinate system in the current control cycle.

In step S207, the moving-object-based-coordinate-system converter 133 executes the series of process steps described in FIG. 4, thus converting the position coordinates of the moving object expressed in the subject-vehicle-based coordinate system into position coordinates in the moving-object-based coordinate system. As a result, the history of the position coordinates of the moving object expressed in the moving-object-based coordinate system in the current control cycle is stored in the moving-object-based-coordinate-system history storage 135; moreover, the history of the position coordinates of the moving object expressed in the subject-vehicle-based coordinate system in the current control cycle is stored in the subject-vehicle-based-coordinate-system history storage 136.

In step S208, the coordinate converter 13 determines whether the set of position coordinates of the moving object in the current control cycle that is stored anew in the moving-object-based-coordinate-system history storage 135, is an effective value on the basis of a comparison with a history of position coordinates of the moving object that is previously stored in the moving-object-based-coordinate-system history storage 135. Distance and direction where the moving object can move in one control cycle can be assumed in advance in accordance with types of moving object. For a typical automobile being the moving object, the range of speed change (acceleration) from the last control cycle and the range of variation in the direction of travel resulting from steering can be almost identified. Hence, the position coordinates of the moving object in the current control cycle is determined to be effective, when the position coordinates of the moving object in the current control cycle falls within an effective range that is established based on the position coordinates of the moving object in the last control cycle and on the direction of travel of the moving object that is identified from the position coordinates of the moving object in the last and second last control cycles. Furthermore, when the moving object is a pedestrian, an effective range is established that reflects immediate stopping or turning-around.

In the determination in step S208, the position coordinates of the moving object expressed in the subject-vehicle-based coordinate system, which are acquired by the moving-object relative position acquiring unit 12, are not used as they are, but the position coordinates of the moving object converted to the moving-object-based coordinate system are used. This enables determination reflecting only the behavior of the moving object, under no influence of the behavior of the subject vehicle, thereby achieving accurate determination.

If the position coordinates of the moving object in the current control cycle are determined to be effective (i.e., if YES in step S208), the position coordinates of the moving object current control cycle, which are acquired by the moving-object relative position acquiring unit 12, are determined to have been correctly detected. Accordingly, the history stored in step S207 remains stored.

Meanwhile, if the position coordinates of the moving object in the current control cycle are determined to be ineffective (i.e., if NO in step S208), the position coordinates of the moving object in the current control cycle, which is acquired by the moving-object relative position acquiring unit 12, are determined to have not been correctly detected due to a detection error or other reasons. Accordingly, in step S209, the coordinate converter 13 deletes the position coordinates of the moving object in the current control cycle stored in step S207 from its history.

In step S210, the corrector 2 checks whether a correction execution flag is ON. The correction execution flag indicates whether to perform filtering in the filtering unit 21. If the correction execution flag is ON (i.e., if YES in step S210), the filtering unit 21, in step S211, filters the history of the position coordinates of the moving object expressed in the subject-vehicle-based coordinate system stored in the subject-vehicle-based-coordinate-system history storage 136.

In step S212, the moving-object-to-collide determiner 31 determines whether the moving object is a moving-object-to-collide on the basis of the history of the position coordinates of the moving object in the subject-vehicle-based coordinate system. If the moving object is determined to be a moving-object-to-collide (if YES in step S212), the collision avoidance controller 41, in step S213, becomes active to perform collision avoidance control for collision avoidance between the subject vehicle and the moving object. The process flow in FIG. 5 then ends.

If the moving object is determined to be not a moving-object-to-collide (i.e., if NO in step S212), the target-moving-object determiner 32, in step S214, determines whether the moving object is a target moving object on the basis of the position coordinates of the moving object in the subject-vehicle-based coordinate system. If the moving object is determined to be a target moving object (i.e., if YES in step S214), the follow-up travel controller 42, in step S215, becomes active to perform follow-up travel control for the subject vehicle to travel while following the moving object. The process flow in FIG. 5 then ends.

If the moving object is determined to be neither a moving-object-to-collide nor a target moving object (i.e., if NO in step S214), the collision avoidance controller 41 and the follow-up travel controller 42 are not activated, and the process flow in FIG. 5 ends.

In the vehicle control system according to the preferred embodiment, the history of the position coordinates of the moving object stored in the moving-object-based-coordinate-system history storage 135, which is expressed in the moving-object-based coordinate system, is not affected by the behavior of the subject vehicle. The history of the position coordinates of the moving object stored in the subject-vehicle-based-coordinate-system history storage 136, which is converted from the position coordinates of the moving object stored in the moving-object-based-coordinate-system history storage 135 to the subject-vehicle-based coordinate system, is not affected by the behavior of the subject vehicle in the past. Consequently, positional information about the moving object is obtained that is less affected by the behavior of the subject vehicle. This enables the trajectory of the moving object to be determined with high accuracy.

Figure 6:
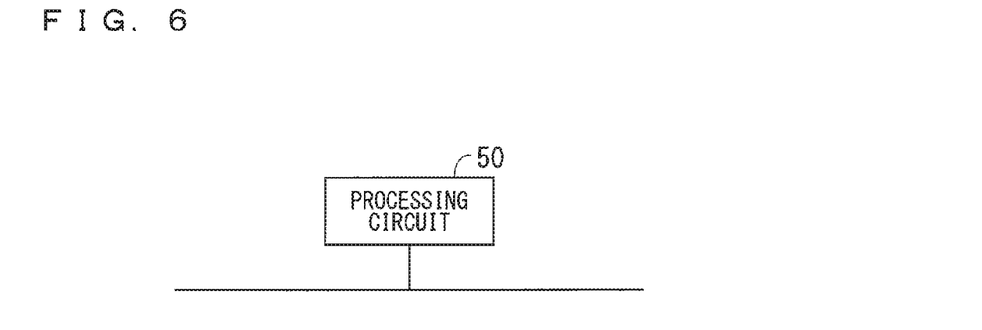
FIG. 6 is a diagram illustrating an example of the hardware configuration of the moving object detector.
Figure 7:
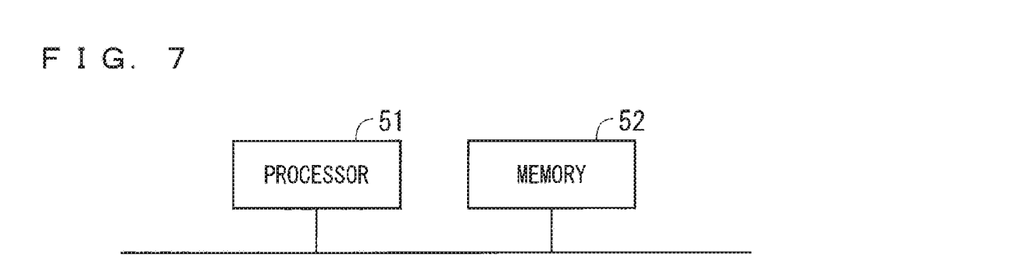
FIG. 7 is a diagram illustrating an example of the hardware configuration of the moving object detector.

FIGS. 6 and 7 are each a diagram illustrating an example of the hardware configuration of the moving object detector 1. The function of each component of the moving object detector 1 illustrated in FIG. 1 is implemented by, for instance, a processing circuit 50 illustrated in FIG. 6. That is, the moving object detector 1 includes the processing circuit 50 for acquiring position coordinates of a moving object expressed in a subject-vehicle-based coordinate system that is based on the position of a subject vehicle, acquiring the state quantity of the subject vehicle, and generating a history of position coordinates of the moving object expressed in a moving-object-based coordinate system that is based on the position of the moving object, on the basis of the position coordinates of the moving object expressed in the subject-vehicle-based coordinate system, and the state quantity of the subject vehicle. The processing circuit 50 may be dedicated hardware. Alternatively, the processing circuit 50 may be configured using a processor (e.g., a central processing unit or CPU for short, a processing unit, a calculator, a microprocessor, a microcomputer, or a digital signal processor or DSP for short) to execute a program stored in a memory.

For dedicated hardware being the processing circuit 50, examples of the processing circuit 50 include a single circuit, a complex circuit, a programmed processor, a parallel-programmed processor, an application specific integrated circuit (ASIC), a field-programmable gate array (FPGA), and a combination thereof. The functions of the individual components of the moving object detector 1 may be implemented by separate processing circuits, or may be, all together, implemented by a single processing circuit.

FIG. 7 is a diagram illustrating the hardware configuration of the moving object detector 1 when the processing circuit 50 is configured using a processor 51 to execute a program. In this case, the functions of the components of the moving object detector 1 are implemented by software and other things (software, firmware, or a combination of software and firmware). The software and other things are written as a program and stored in a memory 52. The processor 51 implements the function of each component by reading and then executing the program stored in the memory 52. That is, the moving object detector 1 includes the memory 52 to store a program which, when executed by the processor 51, performs the following processes: acquiring position coordinates of a moving object expressed in a subject-vehicle-based coordinate system that is based on the position of a subject vehicle; acquiring the state quantity of the subject vehicle; and generating a history of position coordinates of the moving object expressed in a moving-object-based coordinate system that is based on the position of the moving object, on the basis of the position coordinates of the moving object expressed in the subject-vehicle-based coordinate system, and the state quantity of the subject vehicle. In other words, this program is for a computer to execute the procedure or method of the operation of the components included in the moving object detector 1.

Here, examples of the memory 52 include a non-volatile or volatile semiconductor memory (e.g., a random access memory or RAM for short, a read only memory or ROM for short, a flash memory, an erasable programmable read only memory or EPROM for short, or an electrically erasable programmable read only memory or EEPROM for short), a hard disk drive (HDD), a magnetic disc, a flexible disc, an optical disc, a compact disc, a mini disc, a digital versatile disc (DVD), and drivers thereof. Alternatively, the memory 52 may be any kind of storing medium that will be used in the future.

The foregoing has described that the functions of the components of the moving object detector 1 are implemented by one of hardware, and software and other things. Part of the components of the moving object detector 1 may be implemented by dedicated hardware; and different part of the components, by software and other things. For instance, the functions of part of the components can be implemented by the processing circuit 50, which is dedicated hardware; moreover, the functions of different part of the components can be implemented by the processing circuit 50 (i.e., the processor 51) reading and then executing the program stored in the memory 52.

As described above, the moving object detector 1 can implement the aforementioned individual functions using hardware, or software and other things, or using a combination thereof.

It is noted that the preferred embodiment of the present invention can be modified and omitted as appropriate, within the scope of the invention.

While the invention has been shown and described in detail, the foregoing description is in all aspects illustrative and not restrictive. It is therefore understood that numerous modifications and variations can be devised without departing from the scope of the invention.

What is claimed is:

1. A moving object detector comprising:
a processor to execute a program; and
a memory to store the program which, when executed by the processor, performs processes of,
acquiring position coordinates of a moving object expressed in a subject-vehicle-based coordinate system that is based on a position of a subject vehicle,
acquiring a state quantity of the subject vehicle,
generating a history of position coordinates of the moving object expressed in a moving-object-based coordinate system that is based on a position of the moving object, on the basis of the position coordinates of the moving object expressed in the subject-vehicle-based coordinate system, and the state quantity of the subject vehicle, and
determining effectiveness of newly acquired position coordinates of the moving object, by comparing position coordinates of the moving object converted from the newly acquired position coordinates of the moving object to the moving-object-based coordinate system, with the history of the position coordinates of the moving object expressed in the moving-object-based coordinate system.

2. The moving object detector according to claim 1, wherein the state quantity of the subject vehicle includes a travel speed of the subject vehicle, and a yaw rate or yaw angle of the subject vehicle.

3. The moving object detector according to claim 1, wherein the processor further filters the history of the position coordinates of the moving object expressed in the moving-object-based coordinate system.

4. A moving object detector comprising:
a processor to execute a program; and
a memory to store the program which, when executed by the processor, performs processes of,
acquiring position coordinates of a moving object expressed in a subject-vehicle-based coordinate system that is based on a position of a subject vehicle,
acquiring a state quantity of the subject vehicle,
generating a history of position coordinates of the moving object expressed in a moving-object-based coordinate system that is based on a position of the moving object, on the basis of the position coordinates of the moving object expressed in the subject-vehicle-based coordinate system, and the state quantity of the subject vehicle, and
converting the history of the position coordinates of the moving object expressed in the moving-object-based coordinate system into a history of position coordinates of the moving object expressed in the subject-vehicle-based coordinate system.

5. The moving object detector according to claim 4, wherein the processor further filters the history of the position coordinates of the moving object expressed in the moving-object-based coordinate system, or the history of the position coordinates of the moving object converted from the history of the position coordinates of the moving object expressed in the moving-object-based coordinate system to the subject-vehicle-based coordinate system.

6. A vehicle control system comprising:
the moving object detector according to claim 4;
a moving object determiner configured to determine whether the moving object is a target moving object to be followed by the subject vehicle, on the basis of the history of the position coordinates of the moving object converted from the history of the position coordinates of the moving object expressed in the moving-object-based coordinate system to the subject-vehicle-based coordinate system; and
a travel controller that, upon determination that the moving object is the target moving object, controls the subject vehicle to travel while following the moving object.

7. A vehicle control system comprising:
the moving object detector according to claim 4;
a moving object determiner configured to determine whether the moving object is a moving-object-to-collide that possibly collides against the subject vehicle, on the basis of the history of the position coordinates of the moving object converted from the history of the position coordinates of the moving object expressed in the moving-object-based coordinate system to the subject-vehicle-based coordinate system; and
a travel controller that, upon determination that the moving object is the moving-object-to-collide, controls traveling of the subject vehicle for avoidance of a collision against the moving object.

8. A method for detecting a moving object, comprising:
acquiring position coordinates of a moving object expressed in a subject-vehicle-based coordinate system that is based on a position of a subject vehicle;
acquiring a state quantity of the subject vehicle;
generating a history of position coordinates of the moving object expressed in a moving-object-based coordinate system that is based on a position of the moving object, on the basis of the position coordinates of the moving object expressed in the subject-vehicle-based coordinate system, and the state quantity of the subject vehicle, and
determining effectiveness of newly acquired position coordinates of the moving object, by comparing position coordinates of the moving object converted from the newly acquired position coordinates of the moving object to the moving-object-based coordinate system, with the history of the position coordinates of the moving object expressed in the moving-object-based coordinate system.

9. The method according to claim 8, wherein the state quantity of the subject vehicle includes a travel speed of the subject vehicle, and a yaw rate or yaw angle of the subject vehicle.

10. The method according to claim 8, further comprising filtering the history of the position coordinates of the moving object expressed in the moving-object-based coordinate system.

11. A method for detecting a moving object, comprising:
acquiring position coordinates of a moving object expressed in a subject-vehicle-based coordinate system that is based on a position of a subject vehicle;
acquiring a state quantity of the subject vehicle;
generating a history of position coordinates of the moving object expressed in a moving-object-based coordinate system that is based on a position of the moving object, on the basis of the position coordinates of the moving object expressed in the subject-vehicle-based coordinate system, and the state quantity of the subject vehicle, and
converting the history of the position coordinates of the moving object expressed in the moving-object-based coordinate system into a history of position coordinates of the moving object expressed in the subject-vehicle-based coordinate system.

12. The method according to claim 11, further comprising filtering the history of the position coordinates of the moving object expressed in the moving-object-based coordinate system, or the history of the position coordinates of the moving object converted from the history of the position coordinates of the moving object expressed in the moving-object-based coordinate system to the subject-vehicle-based coordinate system.

13. A method for controlling a vehicle, comprising:
performing the method for detecting a moving object according to claim 11;
determining whether the moving object is a target moving object to be followed by the subject vehicle, on the basis of the history of the position coordinates of the moving object converted from the history of the position coordinates of the moving object expressed in the moving-object-based coordinate system to the subject-vehicle-based coordinate system; and
upon determination that the moving object is the target moving object, controlling the subject vehicle to travel while following the moving object.

14. A method for controlling a vehicle, comprising:
performing the method for detecting a moving object according to claim 11;
determining whether the moving object is a moving-object-to-collide that possibly collides against the subject vehicle, on the basis of the history of the position coordinates of the moving object converted from the history of the position coordinates of the moving object expressed in the moving-object-based coordinate system to the subject-vehicle-based coordinate system; and
upon determination that the moving object is the moving-object-to-collide, controlling traveling of the subject vehicle for avoidance of a collision against the moving object.

* * * * *